US012691398B2

(12) United States Patent
Hursit et al.

(10) Patent No.: US 12,691,398 B2
(45) Date of Patent: Jul. 28, 2026

(54) REACTIVE ADHESIVES FOR FILTRATION APPLICATIONS

(71) Applicant: Zephyros, Inc., Romeo, MI (US)

(72) Inventors: Eren Hursit, Romeo, MI (US); Jeff Apfel, Romeo, MI (US); Scott Mudrich, Romeo, MI (US)

(73) Assignee: ZEPHYROS, INC., Romeo, MI (US)

( * ) Notice: Subject to any disclaimer, the term of this patent is extended or adjusted under 35 U.S.C. 154(b) by 650 days.

(21) Appl. No.: 16/973,583

(22) PCT Filed: Jun. 14, 2019

(86) PCT No.: PCT/US2019/037258
§ 371 (c)(1),
(2) Date: Dec. 9, 2020

(87) PCT Pub. No.: WO2019/241677
PCT Pub. Date: Dec. 19, 2019

(65) Prior Publication Data
US 2021/0252442 A1    Aug. 19, 2021

Related U.S. Application Data

(60) Provisional application No. 62/767,560, filed on Nov. 15, 2018, provisional application No. 62/684,995, filed on Jun. 14, 2018.

(51) Int. Cl.
*B01D 46/00*        (2022.01)
*B01D 29/01*        (2006.01)
          (Continued)

(52) U.S. Cl.
CPC ....... *B01D 46/0001* (2013.01); *B01D 29/012* (2013.01); *B01D 29/07* (2013.01);
          (Continued)

(58) Field of Classification Search
CPC .. B01D 46/0001; B01D 29/012; B01D 29/07; B01D 46/0005; B01D 46/521;
          (Continued)

(56) References Cited

U.S. PATENT DOCUMENTS 6,846,559 B2 *   1/2005   Czaplicki ............... C09J 151/08
                                                                525/122
7,125,461 B2    10/2006   Czaplicki et al.
          (Continued)

FOREIGN PATENT DOCUMENTS

CA           2528998 A1    6/2006
CN        102725046 A     10/2012
          (Continued)

OTHER PUBLICATIONS

EP 1 380 334 A1_English (Year: 2004).*
          (Continued)

*Primary Examiner* — Youngsul Jeong
(74) *Attorney, Agent, or Firm* — The Dobrusin Law Firm, P.C.

(57)          ABSTRACT

A filtration device (10A, 10B, 10C) comprising one or more filtration media (20) secured by one or more activatable adhesive layers (22). A method of forming a filtration device, including: (a) forming the one or more adhesive layers into a desired shape; (b) activating the one or more adhesive layers; (c) securing the one or more filtration media to the one or more adhesive layers; and (d) curing the one or more adhesive layers.

16 Claims, 6 Drawing Sheets

(51) Int. Cl.
  *B01D 29/07*       (2006.01)
  *B01D 46/52*       (2006.01)
  *C09J 7/21*        (2018.01)
  *C09J 7/35*        (2018.01)

(52) U.S. Cl.
  CPC ....... *B01D 46/0005* (2013.01); *B01D 46/521* (2013.01); *C09J 7/21* (2018.01); *C09J 7/35* (2018.01); *B01D 2265/04* (2013.01); *C09J 2301/304* (2020.08); *C09J 2301/408* (2020.08); *C09J 2400/143* (2013.01); *C09J 2400/243* (2013.01); *C09J 2400/283* (2013.01); *C09J 2463/00* (2013.01)

(58) Field of Classification Search
  CPC . B01D 2265/04; C09J 7/35; C09J 7/21; C09J 2301/408; C09J 2301/304; C09J 2400/143; C09J 2400/243; C09J 2400/283; C09J 2463/00
  See application file for complete search history.

(56)                References Cited

U.S. PATENT DOCUMENTS

| | | | |
|---|---|---|---|
| 7,199,165 | B2 | 4/2007 | Kassa et al. |
| 7,892,396 | B2 | 2/2011 | Sheasley |
| 8,236,128 | B2 | 8/2012 | Kassa et al. |
| 8,334,055 | B2 | 12/2012 | Le Gall et al. |
| 8,475,694 | B2 | 7/2013 | Kassa et al. |
| 8,702,899 | B2 | 4/2014 | Spyrou et al. |
| 2006/0005517 | A1 | 1/2006 | Sundet |
| 2012/0324848 | A1 | 12/2012 | Enbom |
| 2016/0208480 | A1* | 7/2016 | Hensley .............. B29C 44/5627 |

FOREIGN PATENT DOCUMENTS

| | | | |
|---|---|---|---|
| CN | 106794407 A | 5/2017 | |
| DE | 10163026 A1 | 7/2003 | |
| EP | 1380334 A1 * | 1/2004 | .......... B01D 46/001 |
| EP | 1671693 A2 | 6/2006 | |
| WO | WO-2015157638 A2 * | 10/2015 | ............. B01D 29/58 |

OTHER PUBLICATIONS

3M_Cure Epoxies with Heat (Year: 2024).*
Search Report & Written Opinion dated Sep. 10, 2019, Application No. PCT/US2019/037258.
India First Examination Report dated Aug. 1, 2022, Application No. 202037054063.
European First Communication dated Aug. 22, 2022, Application No. 19734641.4.
Chinese Second Office Action dated Aug. 5, 2022, Application No. 201980039757.2.
https://img.duxiu.com/n/jpgfs/book/base_dated_Aug. 1, 2022.
Chinese Search Report Dated Jan. 25, 2022, Application No. 2019800397572.
Chinese First Office Action dated Mar. 3, 2022, Application No. 2019800397572.

* cited by examiner

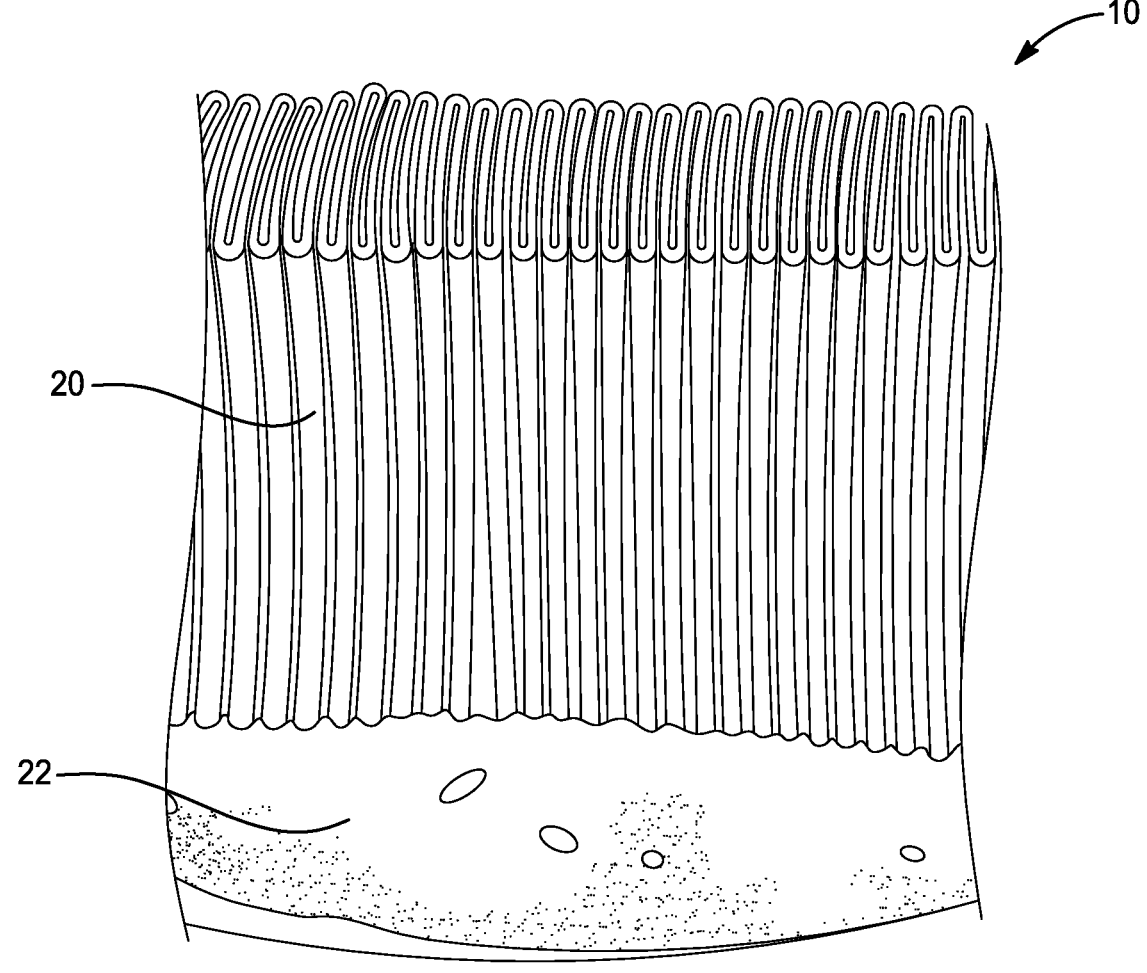
_Fig-2_

REACTIVE ADHESIVES FOR FILTRATION APPLICATIONS

FIELD

The present teachings generally relate to filtration devices, and more particularly, to filtration media bonded to an adhesive.

BACKGROUND

Filtration devices are used in a variety of applications. For example, filtration devices may be found in vehicles, household appliances, tools, construction equipment, lawncare equipment, public transportation, heating, ventilation, and air conditioning (HVAC) systems, fluid filtration systems, or a combination thereof. Filtration devices may filter one or more imperfections or desired particles from a fluid, such as air or water.

Frequently, these filtration devices may be created using a porous material formed into an accordion shape or a plurality of porous layers bonded to one another in a spaced apart manner. To bond the porous material, liquid adhesives may be frequently used. The liquid adhesives may be applied to one or more surfaces of the porous material to form a housing, one or more end caps, or a substrate for the porous filter material. However, using liquid adhesives may present a variety of issues during manufacturing. For example, liquid adhesives may be sensitive to environmental changes such as temperature and humidity. As a result, manufacturing conditions must be controlled and maintained with a high level of precision. If the manufacturing conditions are not controlled precisely, there may be a high scrap rate due to fluctuating material properties during application, such as viscosity of the liquid adhesives.

Thus, it would be attractive to have an adhesive material that can bond to a filtration material free of material property fluctuation due to environmental changes. What is needed is an adhesive material that may be applied in a form other than a liquid form. It would be attractive to have an adhesive material that may form a housing or a shell around at least a portion of a filtration material. What is needed is an adhesive material that may be cured so that the adhesive material may expand around at least a portion of the filtration material. It would be attractive to have a filtration assembly that may be manufactured in a continuous manner. What is needed is an adhesive material that may be extruded and applied to a filtration material in continuous strips. It would be attractive to have a filtration assembly optimized for manufacturing. What is needed is a filtration assembly that is lighter in weight, provides decreased manufacturing cycle times, requires less material to manufacture, or a combination thereof.

SUMMARY

The present teachings meet one or more of the present needs by providing a filtration device comprising one or more filtration media secured by one or more activatable adhesive layers. The present teachings meet one or more of the present needs by providing a filtration device, wherein: the one or more adhesive layers may be an epoxy, ethylene-vinyl acetate, other polymeric system, or a combination thereof; the one or more adhesive layers may be dry to the touch prior to activation of the one or more adhesive layers; the one or more adhesive layers may be foamable; the one or more adhesive layers may maintain a sufficiently high viscosity during and prior to activation to prevent significant flow, independent of certain temperature or environmental conditions; the one or more adhesive layers may be heat activated; the one or more filtration media may be secured to the one or more adhesive layers within a mold so that the one or more adhesive layers may be activated to substantially fill a shape of the mold; the one or more adhesive layers may form end caps for the one or more filtration media; the one or more filtration media may be bonded to each other via the one or more adhesive layers; a plurality of adhesive layers may form a housing to enclose at least a portion of the one or more filtration media; prior to activation, the one or more adhesive layers may be a solid; the one or more adhesive layers may be die cut into a desired shape prior to bonding to the one or more filtration media; the one or more adhesive layers may be non-toxic, moisture resistant, antimicrobial, antifungal, or a combination thereof. The one or more adhesive layers may maintain a sufficiently high viscosity before and during activation such that the filtration media and the one or more adhesive layers can be applied to a contoured and/or skew surface without significant flow of the one or more adhesive layers. The one or more adhesive layers may be extruded.

The present teachings meet one or more of the present needs by providing a method of forming a filtration device, including: (a) forming the one or more adhesive layers into a desired shape; (b) activating the one or more adhesive layers; (c) securing the one or more filtration media to the one or more adhesive layers; and (d) curing the one or more adhesive layer.

The present teachings meet one or more of the present needs by providing a method of forming a filtration device, including: (a) placing the one or more filtration media into a mold; (b) injecting the mold with an adhesive material; (c) activating the adhesive material so that the adhesive material expands and forms the one or more adhesive layers around the one or more filtration media; and (d) curing the adhesive material.

The present teachings meet one or more of the present needs by providing a filtration device, wherein the filtration device may be flexible, wherein the filtration device may be formed in a continuous manner, wherein the one or more adhesive layers may be free of a liquid adhesive, or a combination thereof.

The present teachings provide an adhesive material that can bond to a filtration material free of material property fluctuation due to environmental changes. The present teachings provide an adhesive material that may be applied in a form other than a liquid form. The present teachings provide an adhesive material that may form a housing or a shell around at least a portion of a filtration material. The present teachings provide an adhesive material that may be cured so that the adhesive material may foam around at least a portion of the filtration material. The present teachings provide a filtration device that may be manufactured in a continuous manner. The present teachings provide an adhesive material that may be extruded and applied to a filtration material in continuous strips. The present teachings provide a filtration assembly optimized for manufacturing. The present teachings provide a filtration assembly that is lighter in weight, provides decreased manufacturing cycle times, requires less material to manufacture, or a combination thereof.

BRIEF DESCRIPTION OF THE DRAWINGS

FIG. 2 is a close-up perspective view of a filtration assembly;

DETAILED DESCRIPTION

Figure 1:
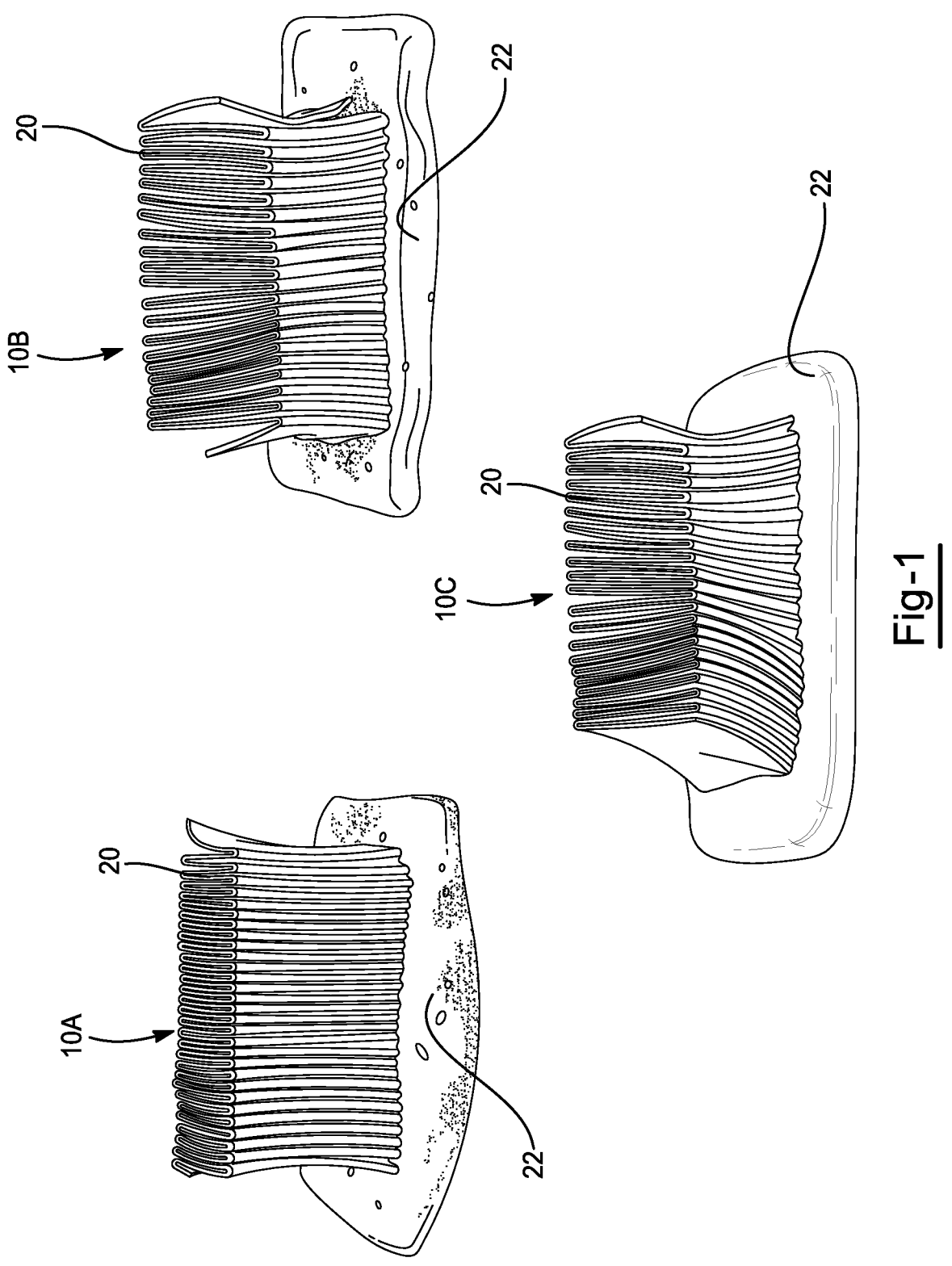
FIG. 1 is a perspective view of a plurality of filtration assemblies.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application is related to and claims the benefit of the filing date of U.S. Provisional Application Ser. No. 62/684, 995, filed Jun. 14, 2018, and 62/767,560, filed Nov. 15, 2018, the contents of both applications being hereby incorporated by reference herein for all purposes.

The teachings herein are directed toward filtration assemblies and the adhesive materials that may be used for making such devices. The filtration assembly may be any filtration device used for filtering one or more components from a fluid, such as air or a liquid. The filtration assembly may be any shape or geometry. For example, the filtration assembly may be shaped to substantially fill a channel of a duct or exhaust so that particulates passing through the duct or exhaust are filtered by the filtration assembly, stopped by the filtration assembly, or both. Non-limiting examples include HVAC filters, automotive exhaust filters, lawnmower filtration devices, water purification systems, or a combination thereof. The filtration assembly may include a filtration media, one or more adhesive materials, or both. The filtration assembly may include one or more housings, one or more end caps, or both. The filtration assembly may include one or more fastening mechanisms to secure the filtration assembly to an assembly requiring filtering. For example, the filtration assembly may include one or more fasteners to fasten the filtration assembly in a channel of an exhaust. The filtration assembly may be integrally formed or may include one or more parts joined together. For example, the filtration assembly may include a filtration media secured to an adhesive material. Alternatively, the filtration assembly may integrally form the filtration media on a substrate of adhesive material. The filtration assembly may be manufactured using a variety of processes, such as injection molding, stamping, extrusion, pultrusion, casting, or a combination thereof. For example, an adhesive material layer may be overmolded onto one or more surfaces of a filtration media. Alternatively, an adhesive material layer may be extruded and disposed on one or more surfaces of the filtration media. The filtration assembly may be compressible, may contain one or more structurally rigid portions, or both. For example, the filtration assembly may include a filtration media encapsulated in a structurally rigid housing and may include compressible gaskets formed of an adhesive material located on terminal ends of the filtration assembly.

The filtration assembly may include one or more filtration media. The filtration media may function to filter one or more solid particulates from a fluid. The filtration media may function to purify one or more fluids by preventing one or more contaminants from passing through the filtration media. The filtration media may be any fibrous or porous material that may allow a fluid to pass through. The fluid may be, for example, any liquid (e.g., water), any gas (e.g., air), or a combination thereof. The filtration media may be made from one or more materials, such as foam, pleated paper, fiberglass, cotton, or a combination thereof. The filtration media may be ionized or electrically charged to attract unwanted particles. The filtration media may be any size or shape. For example, the filtration media may be a continuous piece folded into an accordion structure so that a plurality of layers of the filtration media abut one another. Alternatively, a plurality of filtration sheets may be spaced apart by a desired gap so that a fluid passes through layers of the filtration media sequentially. The filtration media may be structurally rigid or may be flexible. The filtration media may be compressible. For example, the filtration media may be compressible so that the filtration media may be inserted into one or more housings, one or more components requiring filtering, or both. The filtration media may filter a desired percentage or particulates, contaminants, or both passing through one or more fluids. The filtration media may filter about 20% or more, about 30% or more, or about 40% or more of the particulates, contaminants, or both passing through the one or more fluids. The filtration media may filter about 70% or less, about 60% of less, or about 50% or less of the particulates, contaminants, or both passing through the one or more fluids. The filtration media may filter up to, and including 90% or more, or even 100% of the particulates, contaminants, or both passing through the one or more fluids. The filtration media may be replaceable in the filtration assembly. For example, the filtration media may be removed from a housing, adhesive layer, or both and replaced with a new filtration media. The filtration media may be any size and shape required to filter one or more fluids flowing through a desired device. The filtration media may include one or more bends, one or more angles, one or more curves, or a combination thereof. The filtration media may be secured to one or more adhesive layers.

The adhesive layer may function to maintain a structure of the filtration media. The adhesive layer may function to house the filtration media from environmental degradation, such as moisture or debris. The adhesive layer may provide structural support to the filtration media. The adhesive layer may act as a substrate for one or more filtration media disposed on one or more surfaces of the adhesive layer. The adhesive layer may substantially house the filtration media on one or more sides. For example, the adhesive layer may form a shell around the filtration so that a fluid may only pass through a desired entry point and a desired exit point located at opposing ends of the filtration media. The adhesive layer may be any adhesive that may bond to the filtration media. The adhesive layer may be dry to the touch at room temperature so that an operator may handle the adhesive layer without degradation of the adhesive layer. The adhesive layer may be expandable, foamable, or both. The adhesive layer may be activatable to initiate expansion, foaming or both. For example, the adhesive layer may be heat activatable at a heightened temperature so that the filtration media may bond to the adhesive layer. The adhesive layer may expand upon activation to cover a greater portion of the filtration media relative to coverage prior to activation of the adhesive layer. The adhesive layer may expand to cover about 20% more area, about 30% more area, or about 40% more area of the filtration media after activation. The adhesive layer may expand to cover about 50% more area, about 60% more area, or about 70% more area of the filtration media after activation. For example, the adhesive layer may expand upon activation so that the activation material forms one or more end-caps to the filtration media, a housing encompassing the filtration media, or both. The adhesive layers may form one or more gaskets that form a connection surface between the filtration assembly and one or more additional components. The adhesive layer may be made of any adhesive material that may be extruded, injection-molded, cast, or a combination thereof. For example, the filtration media may be positioned in a mold so that an adhesive material is injected around the filtration media and activated to expand, thereby creating a housing around the filtration media. The adhesive layer may bond a plurality of filtration media together to form a filtration assembly. Alternatively, a single filtration media may be disposed on the adhesive layer so that the adhesive layer acts as a substrate. The adhesive layer may be anti-microbial, anti-fungal, moisture resistant, or a combination thereof. The adhesive layer may be flexible or may be structurally rigid. The adhesive layer may, upon activation, substantially form around a shape of the filtration media. The adhesive layer may be any desired size, shape, or both. For example, the adhesive layer may be die-cut to form a ring, square, rectangle, or other shape to match a shape of the filtration media. The adhesive layer may be adhered directly to the filtration media free of any intermediate bonding layer. Alternatively, the adhesive layer may be adhered to an existing shell of the filtration media. For example, the adhesive layer may be adhered to one or more end caps of the filtration media.

The adhesive layer may be formed from one or more adhesive materials having one or more of the properties outlined herein. The adhesive material may be thermosetting or thermoplastic, or both. For example, a portion of the adhesive material may be thermosetting while a separate portion of the adhesive material may be thermoplastic. The adhesive material may be extruded, pultruded, molded (e.g., injection-molded), cut, stamped, or a combination thereof. The adhesive material may be one or more resins mixed to form the adhesive material. Examples of adhesive materials may be found in U.S. Pat. Nos. 6,846,559; 7,125,461; 7,199,165; 7,892,396; 8,236,128; 8,334,055; 8,475,694; and 8,702,889, all of which are incorporated by reference herein for all purposes.

One or more of the adhesive layers may abut the filtration media, a liner, or both. The liner may function to release the filtration assembly from manufacturing machinery, such as a die, mold, tool, or a combination thereof. For example, the liner may be secured in a mold cavity prior to forming the filtration assembly so that the liner adheres to the filtration assembly yet releases from the cavity of the mold. The liner may function to improve structural properties of the filtration assembly, such strength, toughness, moisture resistance, thermal resistance, or a combination thereof. The liner may adhere to the filtration assembly and remain as part of the filtration assembly after manufacturing. Alternatively, the liner may adhere to the filtration assembly during manufacturing, yet be removed (i.e., acts as a release liner) prior to installation of the filtration assembly. The liner may be any size and shape. The liner may vary in thickness. The liner may be made from one or more materials, such as glass fibers, aluminum, nylon, polyester, other fabrics, paper, or a combination thereof. The liner may be flexible or may be structurally rigid. The liner may have one or more abrasive surfaces. The liner may have one or more friction modifiers, such as a lubricant, grease, oil, or a combination thereof. The filtration assembly may be free of a liner. Alternatively, the liner may abut one or more adhesive layers, a housing of the filtration assembly, or both.

One or more adhesive layers may form an adhesive housing. The adhesive housing may function to encompass one or more portions of the filtration media. The adhesive housing may function to maintain a position of the filtration media, maintain structural integrity of the housing, protect the filtration media from debris, moisture, or both, or a combination thereof. The adhesive housing may encompass one or more sides of the filtration media. The adhesive housing may encompass substantially all of the filtration media except for a desire inlet and outlet so that the filtration media may filter one or more fluids passing through the filtration media from the inlet to the outlet, or vice versa. The adhesive housing may be formed from one or more adhesive layers being activated to expand, melt, adhere, or a combination thereof. For example, the adhesive layers may be places along an outer surface of the filtration media so that, upon activation, the adhesive layers expand and form a continuous housing around a substantial portion of the filtration media. The adhesive housing may be one or more end caps located near terminal ends of the filtration media. The adhesive housing may be formed from one or more adhesive layers positioned anywhere along the filtration media. One or more of the adhesive layers may be activated and bonded to the filtration media prior to activation of one or more additional adhesive layers forming the housing. For example, a first adhesive layer may be activated to bond to the filtration media and act as a substrate to the filtration media while a plurality of additional adhesive layers may be activated at a later time to expand and form a housing around the filtration media. A plurality of materials may be used for the adhesive layers to form the housing. For example, a first material may be used to form a substrate for the filtration media while a second material may be used to form adhesive layers for the adhesive housing. The adhesive housing may be used in lieu of, or in conjunction with, an additional housing. For example, the adhesive housing may form an inner shell that is encompassed by an outer shell formed from an additional material such as metal, one or more polymers, fabric, or a combination thereof.

Turning now to the figures, FIG. 1 illustrates a perspective view of filtration assemblies 10. As shown, each filtration assembly 10 includes a filtration media 20 disposed on an adhesive layer 22. The adhesive layer 22, when activated, may be configured to expand a desired amount depending on the application. For example, the filtration assemblies 10 as shown may be ranked from greatest amount of expansion of the adhesive layer 22 to the least amount of expansion of the adhesive layer 22: a first filtration assembly 10A; a second filtration assembly 10B; and a third filtration assembly 10C. It should be noted that the filtration assemblies 10 may also be free of expansion upon activation.

FIG. 2 illustrates a close-up perspective view of a filtration assembly 10. The filtration assembly 10 includes a filtration media 20 disposed within an adhesive layer 22. The adhesive layer 22 maintains a position of the filtration media 20 upon activation and may act as an end cap to the filtration media 20.

Figure 3:
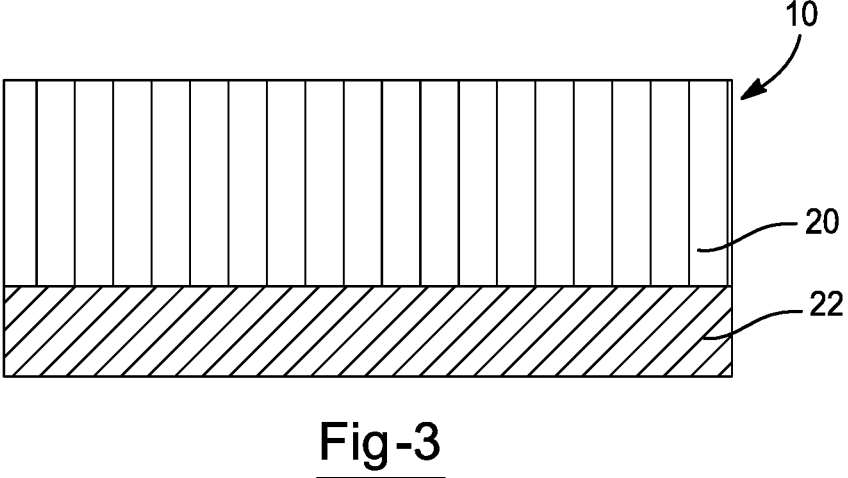
FIG. 3 is a side view of a filtration assembly.

FIG. 3 illustrates a side view of a filtration assembly 10. The filtration assembly 10 includes a filtration media 20 disposed on an adhesive layer 22.

Figure 4:
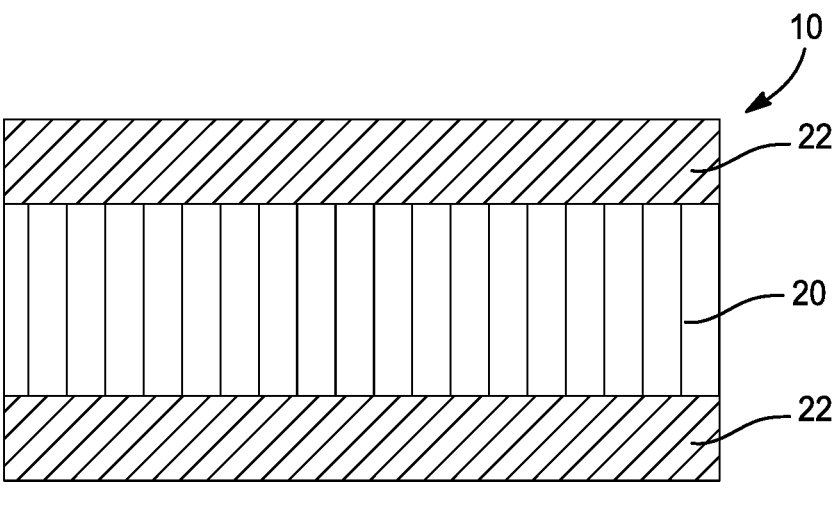
FIG. 4 is a side view of a filtration assembly.

FIG. 4 illustrates a side view of a filtration assembly 10. The filtration assembly 10 includes a filtration media 20 disposed between two adhesive layers 22.

Figure 5A:
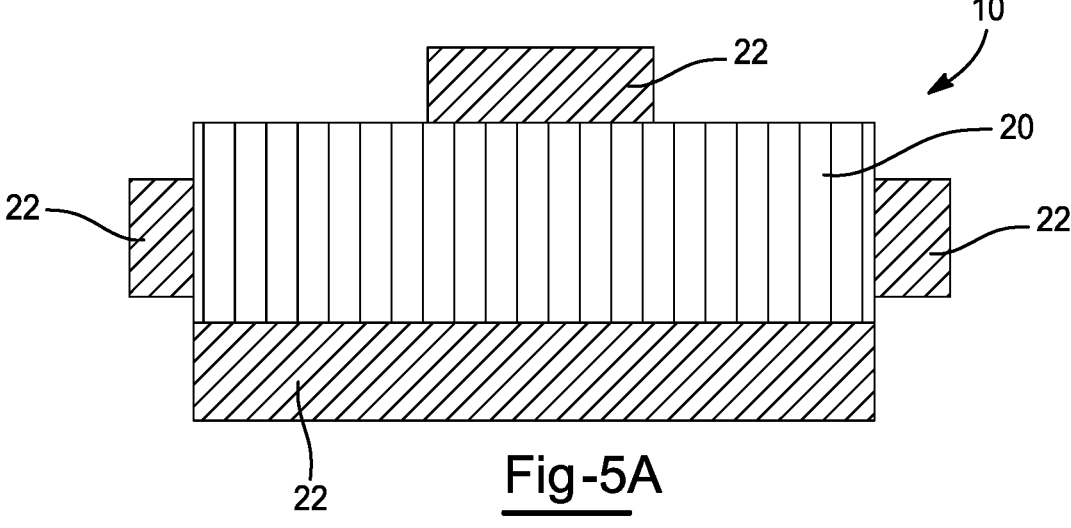
FIG. 5A is a side view of a filtration assembly prior to activation of adhesive layers.

FIG. 5A illustrates a side view of a filtration assembly 10. The filtration assembly 10 includes a filtration media 20 positioned between a plurality of adhesive layers 22 prior to activating the adhesive layers 22. The adhesive layers 22 are positioned and adhered around the filtration media 20 so that, upon activation, the adhesive layers 22 form an adhesive housing (see FIG. 6B).

Figure 5B:
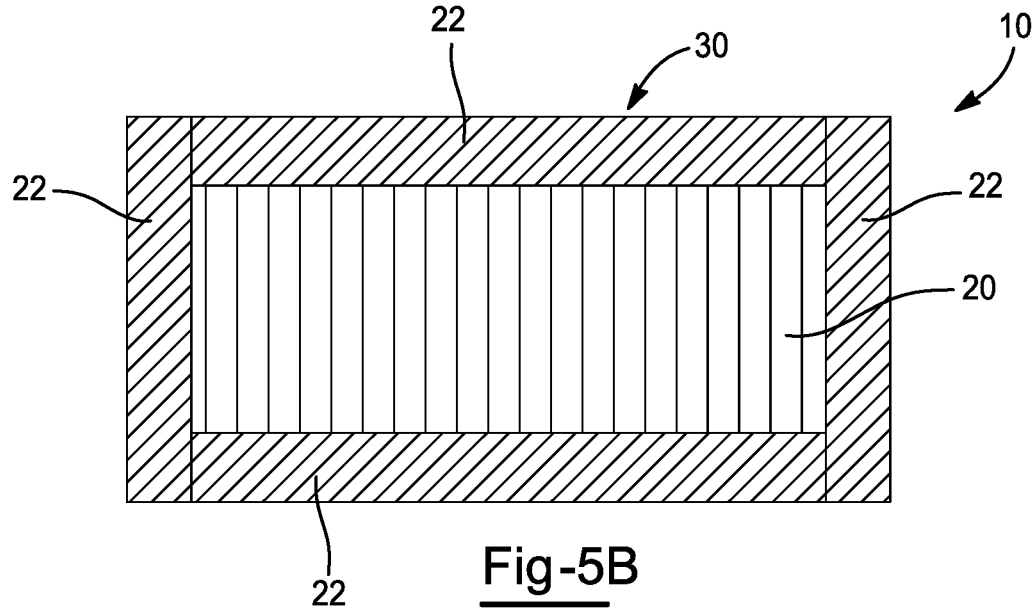
FIG. 5B is a side view of the filtration assembly of FIG. 6A after activation of the adhesive layers.

FIG. 5B illustrates a side view of the filtration assembly 10 of FIG. 6A. The filtration assembly includes a filtration media 20 positioned between a plurality of adhesive layers 22. As shown, after activation, the adhesive layers 22 expand to form an adhesive housing 30 substantially or fully encapsulating sides of the filtration media 20. The adhesive housing 30 may be encapsulate a plurality of exposed sides of the filtration media 20, may expand to form one or more end-caps abutting terminal ends of the filtration media 20, or both. It should be noted that the adhesive housing 30 may be used in conjunction with, or in lieu of, one or more additional end-caps, one or more additional housings, or both.

Figure 6:
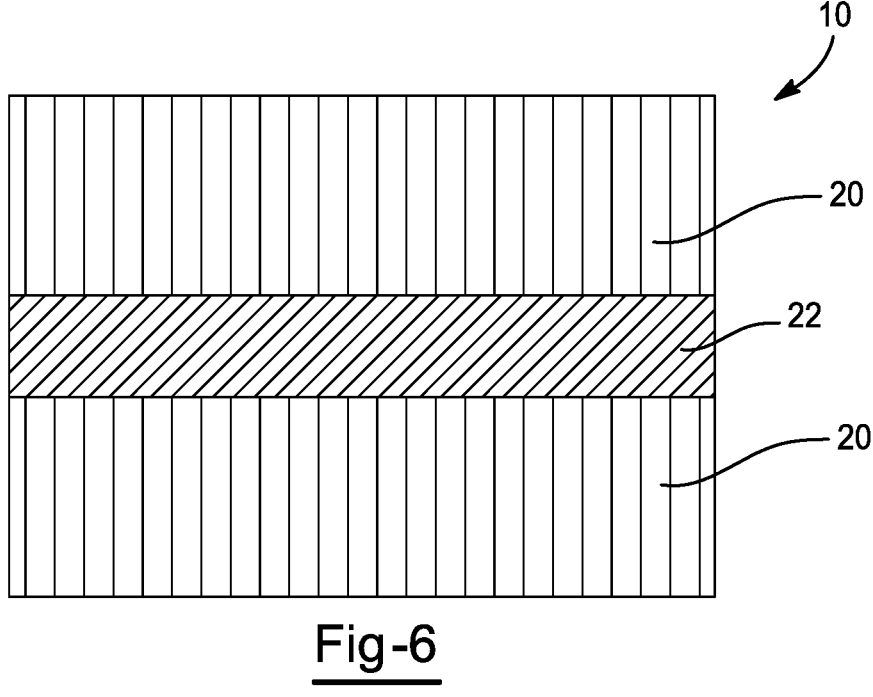
FIG. 6 is a side view of a plurality of filtration media joined together by an adhesive layer.

FIG. 6 illustrates a side view of a filtration assembly 10. The filtration assembly 10 includes a plurality of filtration media 20 adhered to each other via an adhesive layer 22.

Figure 7:
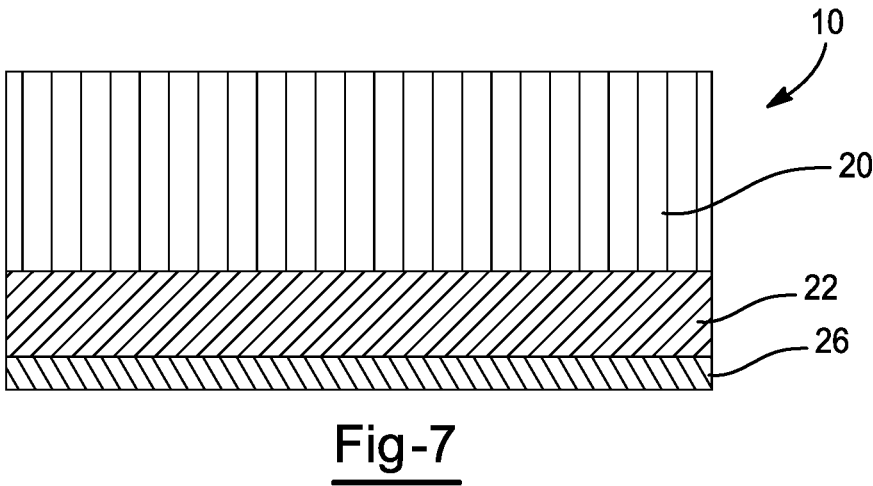
FIG. 7 is a side view of a filtration assembly.

FIG. 7 illustrates a side view of a filtration assembly 10. The filtration assembly 10 includes a filtration media 20 disposed on an adhesive layer 22. A liner 26 is secured to a surface of the adhesive layer 22. The liner 26 may be removable from the adhesive layer 22. For example, the liner 26 may be removed from the adhesive layer 22 prior to installation of the filtration assembly 10, prior to activation of the adhesive layer 22, or both. The liner may be fixedly secured to the adhesive layer 22 and may remain as part of the filtration assembly 10 after installation, after activation of the adhesive layer 22, or both.

Figure 8:
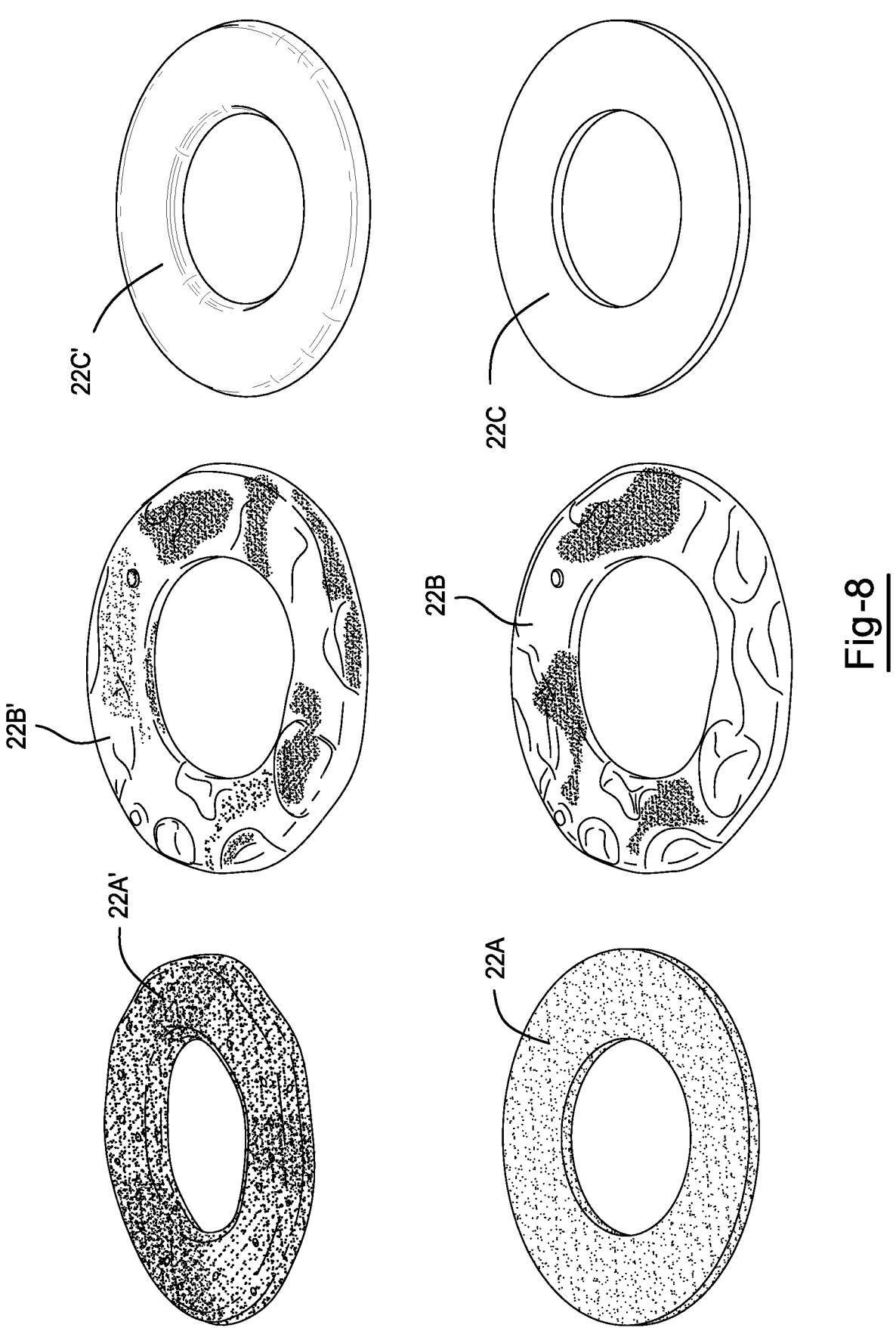
FIG. 8 is a perspective view of a plurality of adhesive layers before and after activation.

FIG. 8 illustrates a perspective view of plurality of adhesive layers 22. Each adhesive layer may be activated to expand, foam, or both to a desired shape. Each adhesive layer (22A, 22B, and 22C) is shown prior to activation having a substantially similar shape. However, after activation, based on varying material properties, the adhesive layers 22 expand to varying sizes (22A', 22B' and 22C' respectively).

The explanations and illustrations presented herein are intended to acquaint others skilled in the art with the teachings herein, their principles, and their practical application. The above description is intended to be illustrative and not restrictive. Those skilled in the art may adapt and apply the teachings in their numerous forms, as may be best suited to the requirements of a particular use.

Accordingly, the specific embodiments of the present teachings as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

The disclosures of all articles and references, including patent applications and publications, are incorporated by reference for all purposes. Other combinations are also possible as will be gleaned from the following claims, which are also hereby incorporated by reference into this written description.

What is claimed is:

1. A filtration device comprising:
one or more filtration media secured by one or more activatable adhesive layers;
wherein the one or more activatable adhesive layers are heat activated to adhere, cure, and foam, so that the one or more filtration media bonds to the one or more activatable adhesive layers;
wherein the one or more activatable adhesive layers are die-cut into a desired shape;
wherein the one or more activatable adhesive layers form an adhesive housing;
wherein the adhesive housing encompasses one or more sides of the one or more filtration media; and
wherein the one or more activatable adhesive layers are a thermosetting material, and wherein the thermosetting material is an epoxy.

2. The filtration device according to claim 1, wherein the one or more activatable adhesive layers are dry to the touch and free of flow prior to activation of the one or more activatable adhesive layers.

3. The filtration device according to claim 1, wherein the one or more activatable adhesive layers maintain a sufficiently high viscosity during and prior to activation to substantially prevent flow independent of temperature or environmental conditions.

4. The filtration device according to claim 3, wherein the one or more filtration media are adhered to the one or more activatable adhesive layers within a mold.

5. The filtration device according to claim 1, wherein the one or more activatable adhesive layers form one or more end caps for the one or more filtration media.

6. The filtration device according to claim 1, wherein the one or more filtration media are bonded to a second filtration medium via the one or more activatable adhesive layers.

7. The filtration device according to claim 1, wherein prior to activation, the one or more activatable adhesive layers are a solid.

8. The filtration device according to claim 1, wherein the one or more activatable adhesive layers are one or more of moisture-resistant, non-toxic, antimicrobial, and antifungal.

9. The filtration device according to claim 4, wherein the one or more filtration media are located into the mold where one or more activatable adhesive layers are injected into the mold and activated so that the one or more activatable adhesive layers expand and cure to form the one or more activatable adhesive layers around the one or more filtration media.

10. The filtration device according to claim 1, wherein the filtration device is flexible.

11. The filtration device according to claim 1, wherein the filtration device is formed in a continuous manner.

12. The filtration device according to claim 1, wherein the one or more activatable adhesive layers are free of any liquid adhesive.

13. The filtration device according to claim 1, wherein one or more liners are secured to the one or more activatable adhesive layers.

14. The filtration device according to claim 12, wherein the one or more activatable adhesive layers maintain a sufficiently high viscosity before and during activation such that the one or more filtration media and the one or more activatable adhesive layers can be applied to a contoured and/or skew surface without significant flow of the one or more activatable adhesive layers.

15. The filtration device according to claim 1, wherein the one or more activatable adhesive layers are extruded.

16. The filtration device according to claim 1, wherein the one or more activatable adhesive layers form one or more gaskets that form a connection surface between the filtration device and one or more additional components.

* * * * *